United States Patent
Yazdani Damavandi

(10) Patent No.: US 7,554,283 B2
(45) Date of Patent: Jun. 30, 2009

(54) NON-REACTION TORQUE DRIVE

(76) Inventor: Shahriar Yazdani Damavandi, Joumhouri Blvd., West Moslemebne Aghi, # 78, Karaj, TE (IR)

(*) Notice: Subject to any disclaimer, the term of this patent is extended or adjusted under 35 U.S.C. 154(b) by 175 days.

(21) Appl. No.: 11/762,812

(22) Filed: Jun. 14, 2007

(65) Prior Publication Data

US 2008/0012514 A1    Jan. 17, 2008

(51) Int. Cl.
  *B64C 17/06* (2006.01)
(52) U.S. Cl. .................. 318/649; 318/625; 318/648; 74/5.4
(58) Field of Classification Search ......... 318/430–434, 318/638, 639, 625; 74/5.4
  See application file for complete search history.

(56) References Cited

U.S. PATENT DOCUMENTS

| | | | | |
|---|---|---|---|---|
| 2,950,430 A | * | 8/1960 | Katz | .............. 318/689 |
| 3,446,714 A | * | 5/1969 | Ensley | .............. 205/118 |
| 3,665,283 A | * | 5/1972 | Le Gall | .............. 318/649 |
| 4,021,716 A | | 5/1977 | Rue | |
| 4,164,018 A | * | 8/1979 | Legrand | .............. 701/3 |
| 4,645,994 A | * | 2/1987 | Giancola et al. | .............. 318/649 |
| 4,976,163 A | | 12/1990 | Schumacher | |
| 5,256,942 A | * | 10/1993 | Wood | .............. 318/649 |
| 5,270,594 A | | 12/1993 | Hulsing, II | |
| 5,396,815 A | | 3/1995 | Polites et al. | |
| 5,722,304 A | | 3/1998 | Allen | |
| 5,751,078 A | | 5/1998 | Loewenthal | |
| 5,825,493 A | | 10/1998 | McGlynn | |
| 6,883,999 B1 | | 4/2005 | Jenkins et al. | |
| 7,051,608 B2 | | 5/2006 | Guerrero | |
| 2004/0079178 A1 | * | 4/2004 | Gorshkov | .............. 74/5.4 |
| 2004/0140962 A1 | * | 7/2004 | Wang et al. | .............. 345/179 |

* cited by examiner

*Primary Examiner*—Paul Ip
(74) *Attorney, Agent, or Firm*—Ide Sazane Aryan; Barry Choobin

(57) ABSTRACT

Disclosed is a non-reaction torque drive which can be called Reaction Free Drive or suspended support comprising: a Rotor, a Stator, two gyroscopes which are placed in side two frames, two high speed electro motors which rotate the two gyroscopes, and four 24v DC magnets which are used as actuators. The Drive not only conveys the torque to the output shaft, but also it removes a large percentage of reaction torque (about 95%) and does not pass the torque to its shell and support.

12 Claims, 1 Drawing Sheet

NON-REACTION TORQUE DRIVE

SPONSORSHIP STATEMENT

The present invention is sponsored by Iranian National Science foundation.

TECHNICAL FIELD AND INDUSTRIAL APPLICABILITY OF THE INVENTION

This invention relates to mechanics and the field of engines, motors, electromotors and drives, and all the equipments and devices used to produce torque and rotation.

BACKGROUND OF THE INVETNION

All the rotary motors and drives ever manufactured and used in industry, produce a torque which conforms the third Newton's law (action & reaction law) and as a result of the resistance of the load to rotation, the reaction of the produces torque is equally imposed to their shell and support in an opposite direction.

As a result, all electro motors and rotary drives should be fixed to a foundation or fixed support in order to pass the load reaction to the earth or a fixed place and to be capable to work. Otherwise, the produced power and torque of the motor will be applied to the shell of the motor and instead of rotating the output shaft, the shell of the motor rotates in an opposite direction.

Therefore, a rotary motors and drives not needing a fixed support such as earth would be advantageous.

SUMMARY OF THE INVENTION

The aim of this invention is to produce a new generation of rotary motors and drives not needing a fixed support such as earth, the ones which produce rotary torque or braking resistance against rotating bodies. In this invention it is disclosed a non-reaction torque drive not needing a fixed support such as earth.

This drive works on the basis of the unique and interesting properties of gyroscopes. The gyroscopes installed in this drive change the direction of the torque and along with producing useful rotary torque which can perform work, changes the direction of the reaction and transforms it to elastic strain and thermal energy.

The drive consists of two main mechanical and electrical parts. Each part includes two sections: power section and control section. The mechanical part comprises linear actuators comprising four DC magnets which produce to and fro movements. The electrical part comprises a power circuit wherein the power circuit includes the source which provides energy of the drive. The drive further comprises a control section wherein said control section comprises two micro switches that connect and disconnect the electricity of the magnet according to a defined algorithm and in calculated intervals.

An interesting feature of this devised drive is that it can be used as new kind of brake and a device to wear out the rotation in case the said drive is used as generator and connected to the axle of the rotating source. In this way the drive acts as a brake and produces a resisting torque while passing only a low percentage of this torque to its shell and base. Accordingly, it can be called suspended support.

A suspended support may be defined: "a device which can act as a resistance and a rotary brake which thwart rotation but there is no need for it to be connected to or supported by another fixed thing except its own gravity support".

The main difference between this drive and other engines and motors, is that this motor can mostly remove the reaction torque coming from the load by changing in the direction and just a very small percent of the reaction torque can be transferred to the stator and shell of the motor. In the other words, this motor can be used not only for production of rotational drive torque but also it can act as a transformer for changing the direction of the reaction torque which according to the third low of Newton is equal and opposite to the drive torque. Moreover, this motor can divide the reaction torque into two different parts. The main part of this torque will be removed at the inside of the system and the very small second part it transfer to the shell and stay site in the opposite direction.

In fact, this drive is designed in a way that if the load is applied on the output shaft, a reverse torque is produced which removes 95% of the load applied to the drive and only about 5% is applied to the shell and structure of the drive. As an example supposes 100 n.m of torque is needed to move a conveyor belt. It is evident that in case the regular motors are used, while the motor is applying 100 n.m torque to the conveyor, according the 3rd Newton's law, the conveyor applies 100 n.m of reaction torque to the motor which is applied to the structure and foundation of the motor. But in this devised drive while applying 100 n.m torque to the conveyor, only 10 to 5 n.m of the torque is applied back to the drive in a reverse manner.

BRIEF DESCRIPTION OF THE DRAWINGS

The accompanying drawings, which are incorporated into and form part of the specification, illustrate embodiments of the invention and, together with the description, serve to explain the principles of the invention.

DETAILED DESCRIPTION OF THE INVENTION

Figure 1:
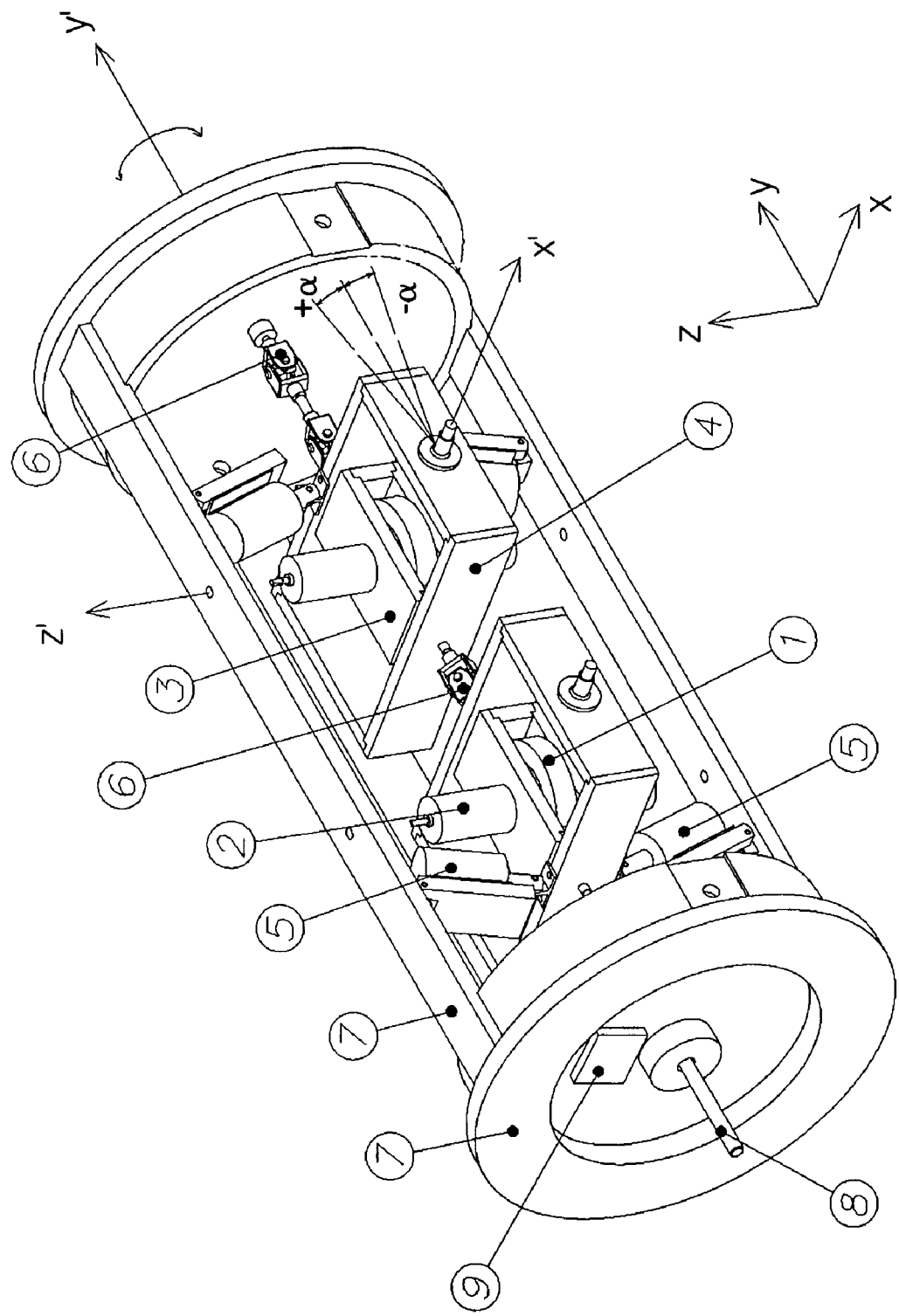
FIG. 1 is a schematic representation of a non-reaction torque drive.

In the following description, reference is made to the accompanying drawing, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be obvious to one skilled in the art that the present invention may be practiced without the specific details or with certain alternative equivalent devices and methods to those described herein. In other instances, wellknown methods, procedures, components, and devices have not been described in detail so as not to unnecessarily obscure aspects of the present invention.

FIG. 1 is a schematic representation of a non-reaction torque drive. The x, y and z-axis in FIG. 1 are fixed and the x', y' and z' are also considered fixed on the center of external frame. Therefore x' and y' have alternative rotation in external frame and the maximum rotational angle is equal to α.

At the first stage of operation, the NON-REACTION TORQUE DRIVE, the control unit (No. 9 in FIG. 1) sends a DC current to magnets (5) which are connected to external frames and produce the power of the drive (In the sample drive, four 24v DC magnets are used as actuators which can be replaced by hydraulic or pneumatic jacks or even an electromotor gearbox) in one side of drive and energizes them. So the magnets apply the first torque around x' axis to external frame (4) and this causes the frames rotate at least 5 degree or more. This torque is transmitted from external frame to internal frame (3) which contains high speed Gyroscope (1). Gyroscopes change the direction of this torque from x' axis to y' & z' axis. The torque around y' axis (Ty') that has a continuous fluctuation, by using a flexible joint (6), it will be established in a same direction with the y axis (x, y, z are fixed Cartesian system are shown in FIG. 1) and is named External Torque (T). Lead to rotation of rotor and internal frame, amount 180 degree. (It's good to mention that the Ty' and Ty, is just applied to the rotor of the drive not to stator) Non-reaction torque drive in fact is a rotational drives which same the most drives transforms one form of energy (such as electricity) into rotary mechanical work and create rotational torque.

The direction of the torque in z' axis is changing due to the change of angle of the z' axis and is divided to two vectors in y and z axis (Ty and Tz).

The amount of the mentioned torque (Ty and Tz) is:

$$Ty = Tz' \cdot \sin \alpha \quad 0° < \alpha < 15° \quad \quad 1)$$

$$Tz = Tz' \cdot \cos \alpha \quad 0° < \alpha < 15° \quad \quad 2)$$

The Tz in two gyroscopes is equal but in opposite direction together so the total amount of Tz is zero.

Regarding equation 1, Ty is a little part of Tz' and it is in the same direction with two systems of the gyroscope and External Torque (T) and it is applied to the stator and shell of drive. (It's good to mention that the Ty and Tz, is just applied to the stator and shell of drive).

At this moment, after 180 degree rotation of rotor and internal frame, the control unit cuts the previous magnets current and sends current to the other side magnets. So this magnets apply a torque around x' axis to the external frame again, but in the opposite direction. It causes to rotate the frame at least 10 degree in opposite direction and according the said process, the gyroscopes convert Tx' to Ty' and Tz'. And finally this cause the rotor (internal frame and exit shaft) rotates another 180 degree in same direction and produce External Torque (T) again. It means that the rotor turn 360 degree whenever the external frame does a see-saw movement each time.

To show the reaction free property of this drive, we analyze the reaction torque coming back from the load which connects to the drive as below:

By applying the motive torque (T) to the load, there will be a reaction torque (T') from the load in opposite direction to the exit shaft around the constant axis of y. $\vec{T} = -\vec{T}'$ T' can be applied from flexible joint around the y' axis to the internal frame and to the gyroscope. The Gyroscope divide The T' into two different torques around x' axis ($\overline{Tx'}$) and Z' ($\overline{Tz'}$).

Two $\overline{Tx'}$ from the first and second gyroscopes are in the opposite direction so they inactive each other.

$\overline{Tz'}$ Due to variations of Z' angle ($\alpha$), it can be divided into two vectors around constant axis of y and z shown as $\overline{Ty}$ and $\overline{Tz}$ and achieve from equations 3 and 4.

$$\overline{Ty} = \overline{Tz'} \cdot \sin \alpha \quad 0° < \alpha < 15° \quad \quad 3)$$

$$\overline{Tz} = \overline{Tz'} \cdot \cos \alpha \quad 0° < \alpha < 15° \quad \quad 4)$$

$\overline{Tz}$ Of first gyroscope which is consist of a very high percent of $\overline{Tz'}$ and is applied to the shell, is equal to the $\overline{Tz}$ from the second gyroscope but in the opposite direction. Therefore they inactive each other.

$\overline{Ty}$ That is consist of a low percent of the applied torque to the shell is in the same direction with the torque of second gyroscope witch is called the "reaction torque" and it can be applied from the load to the structure and engine support. The ultimate reaction torque can be marked by $\overline{T}$.

According to the above text and so the results of practical experiences, it can be found that:

$$\overline{T} = (10\% \sim 5\%) T. \quad \quad 5)$$

But there is the below rule on action and reaction torque for every drives, engines and motors except this drive:

Reaction torque=action torque

Or $$\overline{T} = T \quad \quad 6)$$

With comparing equation 5 and 6 it is clear that the present invented drive decreases reaction torque and acts as non-reaction torque drive.

ADVANTAGE EFFECT

As most of the application of reaction free drive is in devices not on the surface of the earth that is in the air, space or sea, some of advantage effects of this invention are: In the propeller of submarines particularly small exploratory ones, torpedoes and also in their control section and to change their direction. In some equipment of missiles and rockets in which there is a need for motors and torque for their movement or rotation. In satellites and spacecrafts and space stations and places without gravity. As the engine and propeller of helicopter in which, due to the removal of air resistance torque to the wing and body of the helicopter, the rotary torque on the body of the helicopter round the vertical axle reduces a lot and consequently, there will be no need for the tail of the helicopter and its parts thus they can be simplified or made shorter. This will result in the decrease in the total sidelong area of the helicopter which decreases the danger of gunshots for military purposes. Digging under the ground or under the sea, in tunnels, wells, etc. are other applications of this drive. In principle, rotary digging machinery encounters a high reactionary force which forces them to have them fixed to a place. This has been always a problem on the way of all kinds of digging especially in underwater diggings in which the weight decreases due to Archimedes's force in which the problem is doubled. Using this drive, the reactionary torque decreases a lot and the operation of the digging machine increases a lot.

Generally, in the above-mentioned conditions, the use of the said motors prevents deviation and removes the deviation of the devices like missiles, satellites, digging machinery, etc.

Another unique application of the said drive is that it can be used with some slight modifications as rotary brake or suspended support. If this drive is coupled with a rotating body or shaft and turned on, it resist against the rotation and produces breaking torque while passing only a little amount of the torque to the body of the drive in the opposite direction. This application can be widely used in aerospace and marine industries like the above-mentioned ones. To be added, the above-mentioned examples are only some of the various applications of reaction free drive which are rendered according to the limited information of the writer of science and technology.

Although modifications and changes may be suggested by those skilled in the art, it is in the intention of the inventor to embody within the patent warranted hereon all changes and modifications as reasonably and properly come within the scope of their contribution to the art.

I claim:

1. A method for producing a non-reaction torque comprising the steps of:
    producing a motive torque (T);
        applying said motive torque through a shaft to a load, thereby receiving a reaction torque (T');
        dividing said loaded reaction torque into a first pair of torques (Tx') and a second torque (Tz'), wherein said first pair of torques are in opposite directions thereby inactivating each other, and said second toque is divided into two vectors (Ty and Tz) which are result of:

$Ty=Tz'\cdot \sin \alpha \ 0°<\alpha<15°$ $Tz=Tz'\cdot \cos \alpha \ 0°<\alpha<15°$ Where $\alpha$ is variation of Z' angle and angle between y and y'; and
decreasing said loaded reaction torque (T) to (10%~5%) of said motive torque.

2. A method as claimed in claim 1, wherein said decreased loaded reaction torque T is exclusively applied to shell.

3. An apparatus for producing a non reaction torque drive comprising:
    a) a rotor, wherein said rotor comprises:
        i. at least one Gyroscope (1)
        ii. high speed electro motor (2)
        iii. at least one internal frame (3)
        iv. flexible joins (6), and
        v. exit shaft (8)
    b) a stator, wherein said stator comprises:
        i. shell or structure (7)
        ii. at least one external frame (4)
        iii. actuators (5) and
        iv. control unit (9)
    said apparatus further comprises:
    means for sending a DC current to the actuators (5) in a first side of said drive, and energizing said actuators, thereby applying a first torque around X' axis to external frame (4), wherein said first torque causes said external frame to rotate at least 5 degrees in a first direction;
    means for transmitting said first torque from external frame to internal frame (3), wherein said internal frame contains at least one Gyroscope;
    means for changing direction of said first torque from X' axis to Y' and Z' axis, wherein torque around Y' axis (Ty') has a continues fluctuation;
    means for establishing direction of said Ty' axis according to y axis (Ty), thereby rotating the said rotor and internal frame in amount of a first 180 degrees and producing a first external torque (T), wherein said Ty' and Ty are applied to the rotor alone;
    means for changing direction of torque in z' (Tz') axis by changing angle of the z' axis, wherein said Tz' is divided into two torque vectors in Y and Z axis (Ty and Tz), wherein the amount of said torque (Ty and Tz) is defined by:

$Ty=Tz'\cdot \sin \alpha \ 0°<\alpha<15°$ $Tz=Tz'\cdot \cos \alpha \ 0°<\alpha<15°$ Wherein $\alpha$ is angle between Y and Y', Tz in two gyroscopes is equal but in opposite direction so thereby inactivating each other (Tz=0),
and Ty is deduction of Tz' and it is in the same direction with gyroscopes and external torque;
means for cutting off the current to said actuator (5) in said first side of said drive;
means for sending a DC current to the actuators (5) in a second side of said drive, and energizing said actuators, thereby applying a second torque around X' axis to external frame (4), wherein said second torque causes said external frame to rotate at least 10 degrees in opposite direction of said first direction;
means for changing Tx' to Ty' and Tz';
means for rotating said rotor in a second 180 degrees in the same direction as said first 180 degrees, thereby producing a second external torque;
means for applying said first and said second torque (T) drive to a load by exit shaft (8), wherein said load produces a reaction torque drive to said drive (T') in opposite direction of said first and second torque (T) around Y axis, wherein said (T') is applied to said Y' axis via a flexible joint (6);
a first and a second means for dividing said reaction torque (T') into two different torques around x' axis and two different torques around Z' axis, wherein said two different torques around x' axis are in opposite direction, thereby inactivating each other, and said two reaction torque around Z' axis are divided into a first vector (Ty) and a second vector (Tz) defined by:

$Ty=Tz'\cdot \sin \alpha \ 0°<\alpha<15°$ $Tz=Tz' \cos \alpha \ 0°<\alpha<15°$

Wherein Tz of said first means is a high percentage of Tz' applied to said shell, is equal to the Tz from said second means but in the opposite direction, thereby inactivating each other, and Ty consist of a low percent of the applied torque to said shell is in the same direction with the torque of said second means; and
means for producing a reaction torque, wherein relation between said reaction torque (T) and motive torque (T) is defined by:

$T=(10\%\sim 5\%)T.$

4. The apparatus as claimed in claim 3, wherein said dividing means is Gyroscope.

5. The apparatus as claimed in claim 3, wherein said rotor turns 360 degrees whenever the external frame does a see saw movement.

6. The apparatus as claimed in claim 3, wherein said drive removes at least 90% of said reaction torque without passing said at least 90% of said reaction torque to said shell or structure of said stator.

7. The apparatus as claimed in claim 3, wherein said actuators are four magnets.

8. The apparatus as claimed in claim 3, wherein said actuators are pneumatic jacks.

9. The apparatus as claimed in claim 3, wherein said actuators are hydraulic jacks.

10. The apparatus as claimed in claim 3, wherein said actuators are springs.

11. The apparatus as claimed in claim 4, wherein said gyroscope produces rotation, and conveys torque.

12. The apparatus as claimed in claim 3, wherein said drive produces resistance and is employed as a rotary brake which thwarts rotation while being supported by its own gravity support.

* * * * *